July 12, 1932.   L. E. TINNES   1,866,683
POULTRY HOLDER FOR WEIGHING MACHINES
Filed Oct. 9, 1930    2 Sheets-Sheet 1
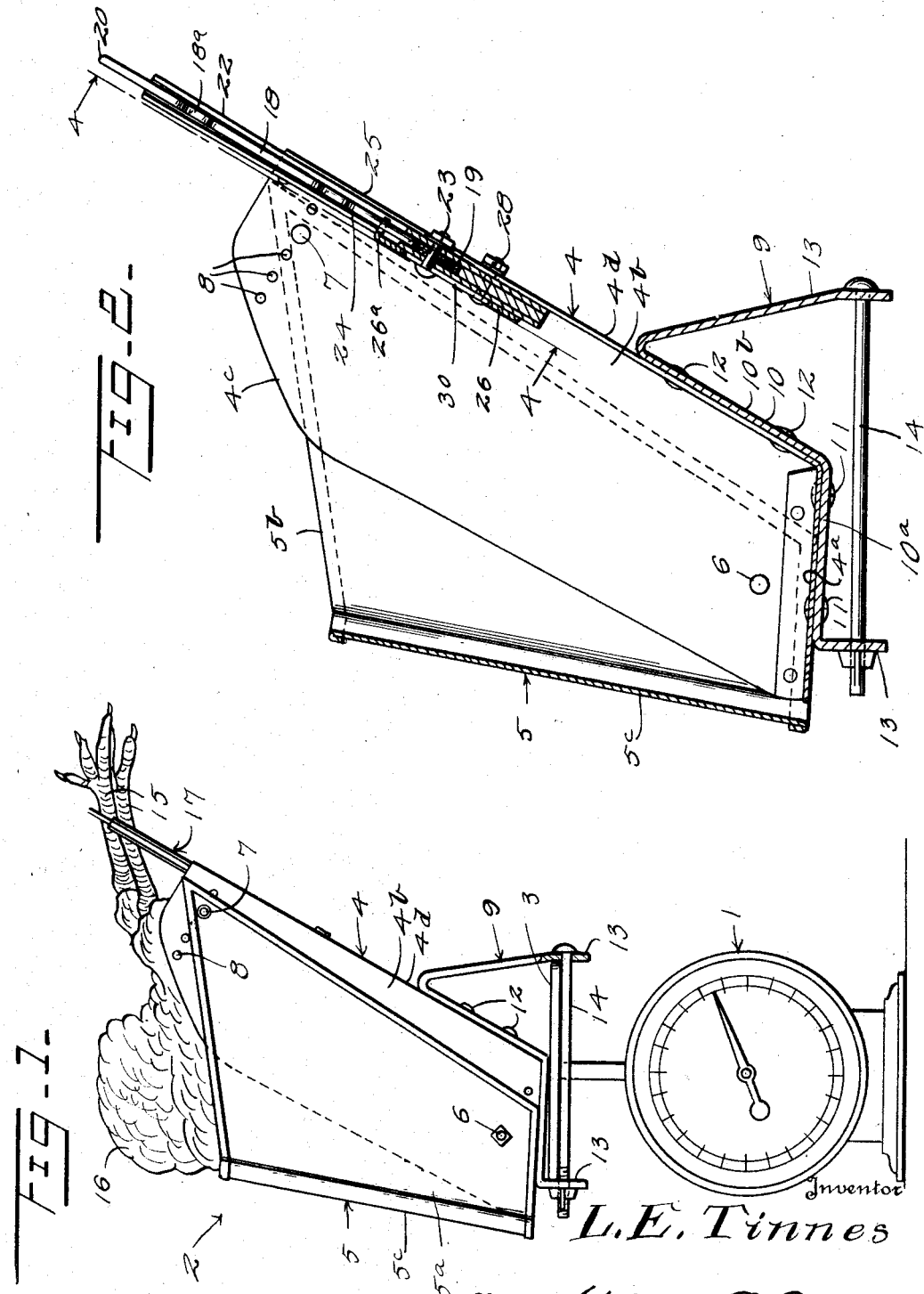
Inventor
L.E. Tinnes
By Watson E. Coleman
Attorney July 12, 1932. L. E. TINNES 1,866,683
POULTRY HOLDER FOR WEIGHING MACHINES
Filed Oct. 9, 1930 2 Sheets-Sheet 2
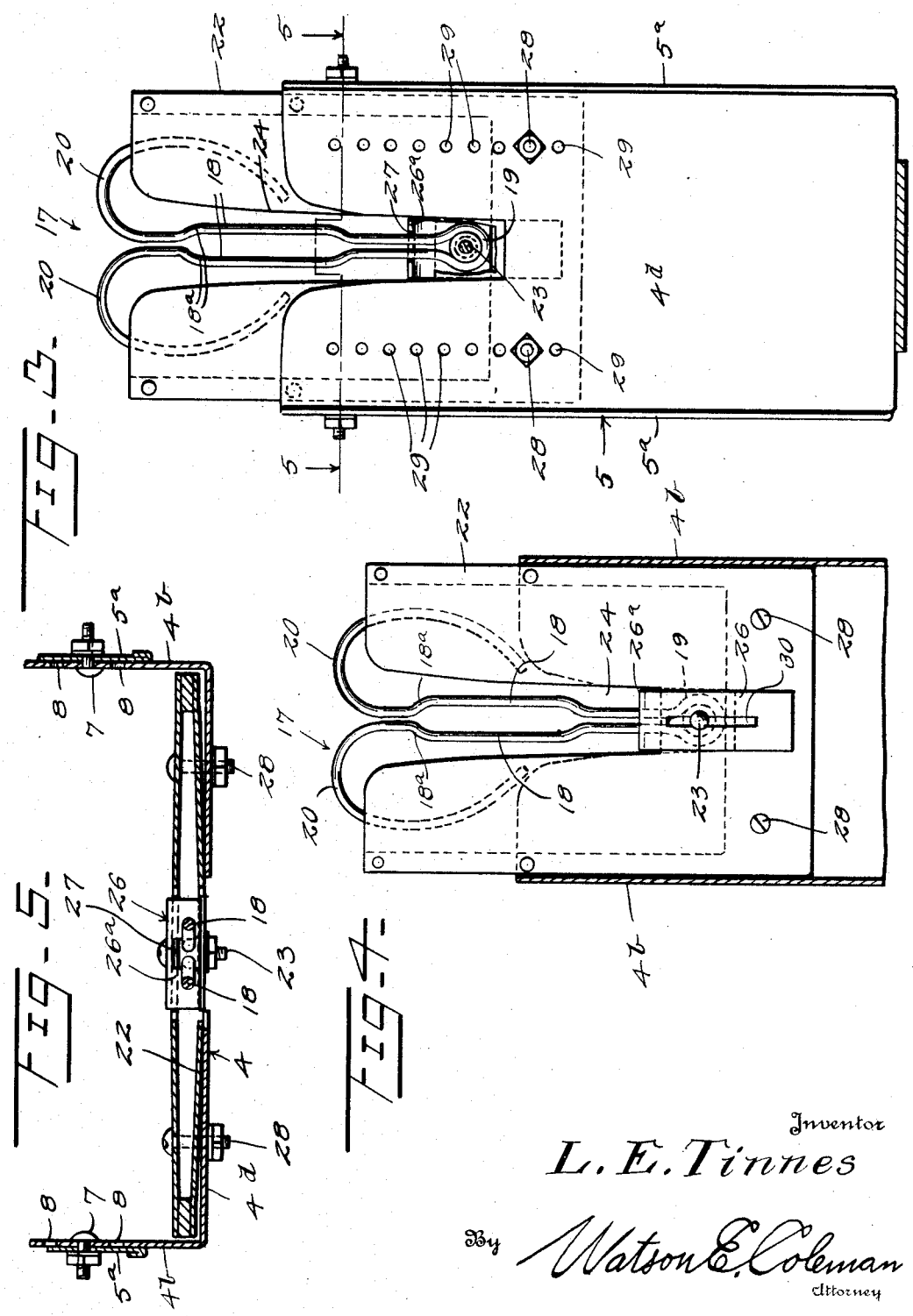
Inventor
L. E. Tinnes
By Watson E. Coleman
Attorney Patented July 12, 1932

1,866,683

UNITED STATES PATENT OFFICE

LEE E. TINNES, OF SIOUX RAPIDS, IOWA

POULTRY HOLDER FOR WEIGHING MACHINES

Application filed October 9, 1930. Serial No. 487,559.

This invention relates to a device adapted to hold poultry while being weighed, and has for one of its objects to provide a device of this character which shall be adapted to reduce to the minimum the labor involved in the weighing of poultry by the practices now obtaining in poultry houses and to also permit a greater number of poultry to be weighed in a given time by a single person than is possible under the present practices.

To attain the foregoing and other objects, the nature of which will appear as the decription proceeds, the invention comprehends the provision of a holder of the character stated which shall embody a receptacle adapted to be secured to the scale of a dial scales mounted on a counter or the like, adapted to permit a chicken to be readily placed therein headfirst and adapted to hold the contained chicken against movement.

The invention further comprehends the provision of a holder of the character stated which shall embody means through the medium of which the receptacle may be readily secured upon the scale of any dial scales and which shall be adapted to support the receptacle upon the scale in an upwardly and laterally inclined position so as to permit a chicken to be readily inserted therein and withdrawn therefrom.

The invention further comprehends the provision of a holder of the character stated wherein the receptacle shall be provided with a clamp into which the legs of the chicken may be directed during the insertion of the chicken into the receptacle, the receptacle and clamp functioning to hold the chicken against movement without the necessity of tieing its legs, and the clamp permitting the legs of the chicken to be readily withdrawn therefrom during the removal of the chicken from the receptacle.

The invention further comprehends the provision of a holder of the character stated wherein the receptacle shall be adjustable to adapt it to receive chickens of different size.

The invention further comprehends the provision of a holder of the character stated which shall be simple and durable and capable of being manufactured and sold at low cost.

The invention is hereinafter more fully described and claimed, and illustrated in the accompanying drawings, wherein:—

Figure 1 is a view in front elevation of the holder applied to a dial scales.

Figure 2 is a sectional view taken on a vertical plane extending centrally through the holder.

Figure 3 is a view in side elevation of the holder.

Figure 4 is a sectional view taken on the plane indicated by the line 4—4 of Figure 2, and Figure 5 is a sectional view taken on the plane indicated by the line 5—5 of Figure 3.

Referring in detail to the drawings, 1 designates a dial scales of the counter type, and 2 the poultry holder, the latter being shown positioned upon and secured to the scale 3 of the scales.

The holder 2 comprises a receptacle which is closed at its lower end and fully opened at its upper end and which consists of sections 4 and 5. The section 4 comprises a bottom wall 4a, a front wall 4b, a rear wall 4c, and a side or lateral wall 4d. The section 5 comprises a front wall 5a, a rear wall 5b, and a side or lateral wall 5c. The walls 4b and 4c of the section 4 and the walls 5a and 5b of the section 5 are arranged in overlapping relation, the walls 5a and 5b being located outwardly of the walls 4b and 4c. The section 5 is pivotally connected near its lower end to the section 4 by bolts 6 which pass through the section walls 4b, 4c, 5a, and 5b. The pivotal connection of the section 5 with the section 4 permits said first section to be swung toward and away from said second section to the end that the width of the receptacle may be varied to accommodate the size of the poultry to be weighed. The section 5 is secured in its adjusted relation to the section 4 by bolts 7 passing through the walls 5a and 5b of the section 5 and through certain of series of openings 8 formed in the walls 4b and 4c of the section 4.

The receptacle is adapted to be positioned upon the scale 3, and it is secured to the scale through the medium of an attaching bracket 9 which comprises an angular seat 10 for the reception of the lower portion of the receptacle section 4. The lower portion 10a of the seat 10 is secured, as at 11, to the lower side of the bottom wall 4a of the section 4 and is adapted to rest upon the scale 3. The upwardly extending portion 10b of the seat 10 is secured, as at 12, to the outer side of the lateral wall 4d of the section 4. The attaching bracket 9 also comprises arms 13 which extend downwardly from the free ends of the seat portion 10a and 10b and which contact with the lateral sides of the scale 3, and bolts 14 which pass through the lower ends of the arms and contact with the other side of the scale.

The receptacle occupies an upwardly and laterally inclined position on the scale 3. It inclines to the right of the scales 1, and its upper edge inclines downwardly to the left, so as to permit a chicken to be readily inserted headfirst therein. As shown in Figure 1, the legs 15 of the chicken 16 are engaged by a clamp 17 located at the upper end of the righthand side of the receptacle. The clamp 17 comprises relatively spaced parallel spring jaws 18 having their upper ends directed toward each other, as at 18a, to provide guards adapted to prevent the chicken from withdrawing its legs from between the jaws. The jaws 18 are connected at their lower ends by a spring loop 19, and they are provided at their upper ends with outwardly and downwardly curved spring guards 20 which permit the legs to be readily directed between the spring jaws during the insertion of the chicken in the receptacle.

The clamp 17 is mounted in a hollow carrier 22 which rests against the inner side of the upper portion of the wall 4d of the receptacle section 4. The clamp 17 is secured to the carrier 22 by a bolt 23 which passes through the clamp loop 19 and the lower end of the carrier. The carrier is provided with a slot 24 which opens up through the sides and upper end thereof and registers with a slot 25 formed in the upper portion of the receptacle wall 4d. The jaws 18 are arranged to register with the slots 24 and 25, and the lower ends of the guards 20 are located within the carrier 22. The clamp 17 is held against rocking movement on its attaching bolt 23 by a stop 26 which is secured to the carrier 22 by the bolt 23 and is provided with an angular upper end 26a positioned in the slot 24 and contacting with the side walls of the slot and having a notch 27 for the reception of the lower portions of the jaws 18. The carrier 22 is secured to the receptacle wall 4d by bolts 28 which pass through the carrier and through certain of series of openings 29 in the side wall, the openings permitting the adjustment of the carrier and its clamp 17 towards and away from the bottom wall 4a of the receptacle so as to position the clamp at that distance from the bottom wall of the receptacle necessary to receive the legs of the chicken as it is inserted in the receptacle. The stop 26 is provided with an elongated slot 30 for the reception of the bolt 23, the slot permitting the adjustment of the angular end 26a of the stop upwardly and downwardly on the lower end portions of the jaws 18, the upper adjustment of the stop end 26a increasing and the downward adjustment of said end decreasing the tension of the jaws.

From the foregoing description, taken in connection with the accompanying drawings, it will be apparent that the holder may be easily and quickly secured upon the scale of a dial scales mounted upon a counter or the like, that when the holder is in applied position the receptacle inclines upwardly to the right so as to permit a chicken to be readily inserted headfirst therein, and that the clamp 17 is arranged at the upper end and on the right side of the receptacle so as to permit the legs of the chicken to be directed between the spring jaws 18 thereof during the last phase of the insertion of the chicken into the receptacle. The chicken occupies a snug position in the receptacle. Due thereto and as the legs of the chicken are engaged in the clamp 17, the chicken cannot move after its insertion in the receptacle, with the result that its weight can be observed and noted immediately after its insertion into the receptacle. It will be further understood that as the receptacle is adjustable as to width and as the clamp 17 is adjustable upwardly and downwardly on the right side of the receptacle, the holder may be adapted for the reception of chickens of different size, the adjustment of the receptacle to the required width and the adjustment of the clamp to the required height being easily accomplished. Owing to the manner in which chickens may be severally inserted in and removed from the receptacle of the holder, and as the holder does not require the tieing of the legs of the chicken, as required by the practices now obtaining in poultry houses, the holder will permit a great number of chickens to be weighed in a given time by one person than is possible under the present practices.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A poultry holder comprising a receptacle adjustable as to width and open at its upper end to permit a chicken to be inserted headfirst therein, and a clamp at the upper end of the receptacle and adapted to receive the legs of the chicken during its insertion in the receptacle.

2. A poultry holder comprising a receptacle adjustable as to width, and opened at its upper end to permit a chicken to be inserted headfirst therein, a clamp arranged at the upper end of one side of the receptacle to receive the legs of the chicken as it is inserted in the receptacle, and means securing the clamp to said side for adjustment in the direction of the length thereof.

3. A poultry holder for a weighing machine, comprising a receptacle open at its upper end to permit a chicken to be inserted headfirst therein and adapted to be positioned on the scale of the machine, arms extending downwardly from the receptacle and contacting with opposite edges of the scale, and means carried by the arms and contacting with the lower side of the scale.

4. A poultry holder comprising a receptacle open at its upper end to permit a chicken to be inserted headfirst therein, the receptacle consisting of sections having overlapping front and rear walls, each section also having a side wall and one of the sections having a bottom wall, pivot elements passing through the lower ends of said overlapping walls to connect the sections for relative adjustment so that its width may be varied, series of openings in the front and rear walls of one of the sections, and elements carried by the front and rear walls of the other sections and passing through certain of said openings to secure the sections in adjusted relation.

5. A poultry holder comprising a receptacle open at its upper end to permit a chicken to be inserted headfirst therein, one of the side walls of the receptacle being provided with a longitudinal slot opened at its upper end, and a clamp secured to said wall and having spring jaws aligned with said slot for the reception therebetween of the legs of the chicken as it is inserted in the receptacle.

6. A poultry holder comprising a receptacle open at its upper end to permit a chicken to be inserted headfirst therein, one of the side walls of the receptacle are provided with a longitudinal slot open at its upper end, a clamp secured to said wall and provided with spaced parallel jaws arranged in alignment with said slot to receive the legs of the chicken therebetween as it is inserted in the receptacle, and guards curving upwardly and laterally from the upper ends of the jaws.

7. A poultry holder comprising a receptacle open at its upper end to permit a chicken to be inserted headfirst therein, one side of the walls of the receptacle being provided with a longitudinal slot open at its upper end, a carrier secured to said wall and provided with a longitudinal slot open at its upper end and registering with said first slot, a clamp secured to the carrier and provided with jaws arranged in the slot of the carrier and adapted to receive therebetween the legs of the chicken as it is inserted in the receptacle, and guards extending upwardly and laterally from the upper ends of the jaws and having their free ends arranged in the carrier.

8. A poultry holder comprising a receptacle open at its upper end to permit a chicken to be inserted headfirst therein, one side of the side walls of the receptacle being provided with a longitudinal slot open at its upper end, a carrier secured to said wall and provided with a longitudinal slot open at its upper end registering with said first slot, a clamp secured to the carrier and provided with jaws arranged in the slot of the carrier and adapted to receive therebetween the legs of the chicken as it is inserted in the receptacle, and means secured to the carrier for varying the tension of the jaws.

9. A poultry holder comprising a receptacle open at its upper end to permit a chicken to be inserted headfirst therein, the receptacle comprising sections adjustable relatively to vary the width of the receptacle, means securing the sections in adjusted relation, one side wall of one section being provided with a longitudinal slot open at its upper end, a clamp having elastic jaws registering with said slot to receive therebetween the legs of the chicken as it is inserted in the receptacle, and means securing the clamp to said wall for adjustment in the direction of the line thereof.

10. A poultry holder comprising a receptacle adapted to receive a chicken sufficiently snug to prevent it from moving its body and wings, the receptacle being provided at one end with an opening through which the chicken may be inserted headfirst into the receptacle, and means located at such end of the receptacle to engage the legs of the chicken and hold them against movement.

11. A poultry holder comprising a receptacle adapted to receive a chicken sufficiently snug to prevent it from moving its body and wings, the receptacle being provided at one end with an opening through which the chicken may be inserted headfirst into the receptacle, and a clamp located at such end of the receptacle and adapted to receive the legs of the chicken during the insertion of the chicken into the receptacle.

12. A poultry holder comprising a receptacle adapted to receive a chicken sufficiently snug to prevent it from moving its body and wings, the receptacle being provided at one end with an opening through which the chicken may be inserted headfirst into the receptacle, the receptacle consisting of sections pivotally connected at their lower ends for adjustment toward and away from each other to vary the width of the receptacle and thus adapt it for the reception of chickens of various size, and means for securing the sections in adjusted relation.

13. A poultry holder for a weighing machine, comprising a receptacle adapted to receive a chicken sufficiently snug to prevent it from moving its body and wings, the receptacle being provided at its upper end with an opening through which the chicken may be inserted headfirst into the receptacle, the receptacle consisting of sections pivotally connected at their lower ends for adjustment toward and away from each other to vary the width of the receptacle and thus adapt it for the reception of chickens of various size, means securing the sections in adjusted relation, and a scale engaging bracket secured to one of the sections.

In testimony whereof I hereunto affix my signature.

LEE E. TINNES.